(12) United States Patent
Zhao

(10) Patent No.: US 10,209,733 B2
(45) Date of Patent: Feb. 19, 2019

(54) ROTATION LIMITING DEVICE

(71) Applicant: SZ DJI OSMO TECHNOLOGY CO., LTD., Shenzhen (CN)

(72) Inventor: Xifeng Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 45 days.

(21) Appl. No.: 15/434,108

(22) Filed: Feb. 16, 2017

(65) Prior Publication Data

US 2017/0160765 A1   Jun. 8, 2017

Related U.S. Application Data

(63) Continuation of application No. PCT/CN2014/085623, filed on Aug. 29, 2014.

(51) Int. Cl.
*G05G 5/04* (2006.01)

(52) U.S. Cl.
CPC ........................ *G05G 5/04* (2013.01)

(58) Field of Classification Search
CPC .... G05G 5/04; F16M 11/08; F16M 2200/021; F21V 21/04
See application file for complete search history.

(56) References Cited

U.S. PATENT DOCUMENTS

| | | | |
|---|---|---|---|
| 1,861,221 A * | 5/1932 | Martin | H02G 11/02 191/12.2 R |
| 3,368,042 A * | 2/1968 | Lace | G04F 3/06 200/38 A |

FOREIGN PATENT DOCUMENTS

| | | |
|---|---|---|
| CN | 202049285 U | 11/2011 |
| CN | 102981235 A | 3/2013 |
| CN | 103016584 A | 4/2013 |
| CN | 103848381 A | 6/2014 |
| CN | 204086993 U | 1/2015 |
| FR | 2584850 A1 | 1/1987 |
| JP | 2003048550 A | 2/2003 |
| JP | 2009014113 A | 1/2009 |

OTHER PUBLICATIONS

The World Intellectual Property Organization (WIPO) International Search Report for PCT/CN2014/085623 dated Apr. 28, 2015 6 Pages.

* cited by examiner

*Primary Examiner* — Vicky A Johnson
(74) *Attorney, Agent, or Firm* — Anova Law Group, PLLC

(57) ABSTRACT

The present invention provides a rotation limiting device. The rotation limiting device includes a base; a rotator capable of rotating relative to the base; and a rotating shaft slidably connected between the base and the rotator. A spiral groove is provided on one of the base and the rotator, and a stripe groove opposite to the spiral groove is provided on the other one of the base and the rotator, two ends of the rotating shaft are slidahly connected respectively in the spiral groove and the stripe groove, and the rotator is rotated to cause the rotating shaft to slide from starting positions of the spiral groove and the stripe groove to terminal positions of the spiral groove and the stripe groove, such that a rotation angle of the rotator is greater than 360°.

18 Claims, 7 Drawing Sheets

ROTATION LIMITING DEVICE

CROSS-REFERENCE TO RELATED APPLICATION

This is a continuation application of International Application No. PCT/CN2014/085623, filed on Aug. 29, 2014, the entire contents of which are incorporated herein by reference.

TECHNICAL FIELD

The present invention relates to rotation control tools and, in particular, to a rotation limiting device.

BACKGROUND

Existing rotation limiting devices generally can only limit rotation within one circumference or rotation within 360°, but cannot limit rotation within a wider angle greater than 360°.

SUMMARY OF THE DISCLOSURE

Accordingly, it is desired to provide a rotation limiting device capable of limiting rotation within wide angles greater than 360°.

The embodiments of the present invention provide a rotation limiting device comprising a base and a rotator capable of rotating relative to the base, a spiral groove may be provided on one of the base and the rotator, a stripe groove opposite to the spiral groove be provided on the other one of the base and the rotator, a starting position of the spiral groove may be opposite to a starting position of the stripe groove, a terminal position of the spiral groove may be opposite to a terminal position of the stripe groove, a rotating shaft may be slidably connected between the base and the rotator, one end of the rotating shaft may be slidably received in the spiral groove, the other end of the rotating shaft may be slidably received in the stripe groove, an angle of the rotating shaft rotating from the starting position to the terminal position of the spiral groove may be greater than 360°.

The embodiments of the present invention also provide a rotation limiting device comprising a base and a rotator capable of rotating relative to the base, a spiral groove may be provided. On one of the base and the rotator, a stripe groove opposite to the spiral groove may be provided on the other one of the base and the rotator, a rotating shaft may be slidably connected between the base and the rotator, two ends of the rotating shaft may be slidably connected respectively in the spiral groove and the stripe groove, the rotator may be rotated to cause the rotating shaft to slide from the starting positions of the spiral groove and the stripe groove to the terminal positions of the spiral groove and the stripe groove, a rotation angle of the rotator may be greater than 360°.

The rotation limiting device according to the present invention may provide a spiral groove and a stripe groove between a base and a rotator which may be capable of rotating with respect to each other, two ends of a rotating shaft may be slidably received respectively in the spiral groove and the stripe groove by the rotating shaft connected between the base and the rotator, when the rotator is rotated, two ends of a rotating shaft may be caused to slide respectively along the spiral groove and the stripe groove, in turn a rotation angle of the rotator may be greater than 360° and the rotation is limited by the rotation angle.

In some embodiments, the spiral groove may be provided on a surface of the base and spirally rotate 480° with the center of the base as a center of a circle of rotation.

In some embodiments, two ends of the rotating shaft may be sleeved with bearings respectively, the hearing at one end may be slidably received in the spiral groove, and the bearing at the other end may be slidably received in the stripe groove.

In some embodiments, a first connecting hole may be provided at a center of the base, a second connecting hole may be provided at a center of the rotator, and a connecting shaft may be fixed in the first connecting hole of the base and rotatably connected in the second connecting hole of the rotator.

In some embodiments, two bearings may be sleeved on the connecting shaft and mounted in the second connecting hole of the rotator.

In some embodiments, a starting position of the spiral groove may be close to the first connecting hole of the base, a terminal position athe spiral goove may be distant from the first connecting hole, and a line connecting the starting position and the terminal position of the spiral groove may pass through the first connecting hole.

In some embodiments, the first connecting hole is a stepped hole and comprises three hole segments with different diameters, a first hole, a second hole, and a third hole, in sequence; the first hole and the third hole is disposed on two ends the second hole; and a diameter of the second hole is less than a diameters of the first hole and a diameters of the third hole, such that two shoulders are formed on the two ends of the second hole.

In some embodiments, the third hole and the spiral groove are on a same surface.

In some embodiments, a starting position of the stripe groove may be close to the second connecting hole of the rotator, a terminal position of the stripe groove may be distant from the second connecting hole, and a line connecting the starting position and the terminal position of the stripe groove may extend along a radial direction of the rotator.

In some embodiments, the spiral groove may be provided on a surface of the base and spirally rotate 480° with a center of the base as a center of a circle of rotation.

In some embodiments, two ends of the rotating shaft may be sleeved with bearings respectively, the bearing at one end may be slidably received in the spiral groove, and the bearing at the other end may be slidably received in the stripe groove.

In some embodiments, the spiral groove and the stripe groove may be disposed face to face, and a terminal position of the spiral groove and a terminal position of the stripe groove may be opposite perpendicularly.

In some embodiments, a first connecting hole may be provided at a center of the base, a second connecting hole may be provided at a center of the rotator, and a connecting shaft may be fixed in the first connecting hole of the base and slidably connected in the second connecting hole of the rotator.

In some embodiments, two bearings may be sleeved on the connecting shaft and mounted in the second connecting hole of the rotator.

In some embodiments, a starting position of the spiral groove may be close to the first connecting hole of the base, a terminal position of the spiral groove may be distant from the first connecting hole, and a line connecting the starting position and the terminal position of the spiral groove may pass through the first connecting hole.

In some embodiments, a starting position of the stripe groove may be close to the second connecting hole of the rotator, a terminal position of the stripe groove may be distant from the second connecting bole, and a line connecting the starting position and the terminal position of the stripe groove may extend along a radial direction of the rotator.

REFERENCE NUMBERS OF ELEMENTS

TABLE 1

| | |
|---|---|
| rotation limiting device | 100 |
| base | 10 |
| first connecting hole | 12 |
| first hole | 121 |
| second hole | 122 |
| third hole | 123 |
| spiral groove | 14 |
| rotator | 20 |
| second connecting hole | 22 |
| stripe groove | 24 |
| connecting shaft | 30 |
| first bearing | 32 |
| rotating shaft | 40 |
| second bearing | 42 |

The disclosed embodiments of the present invention will be explained further in the following embodiments in connection with the above-mentioned drawings.

DETAILED DESCRIPTION OF THE INVENTION

Figure 1:
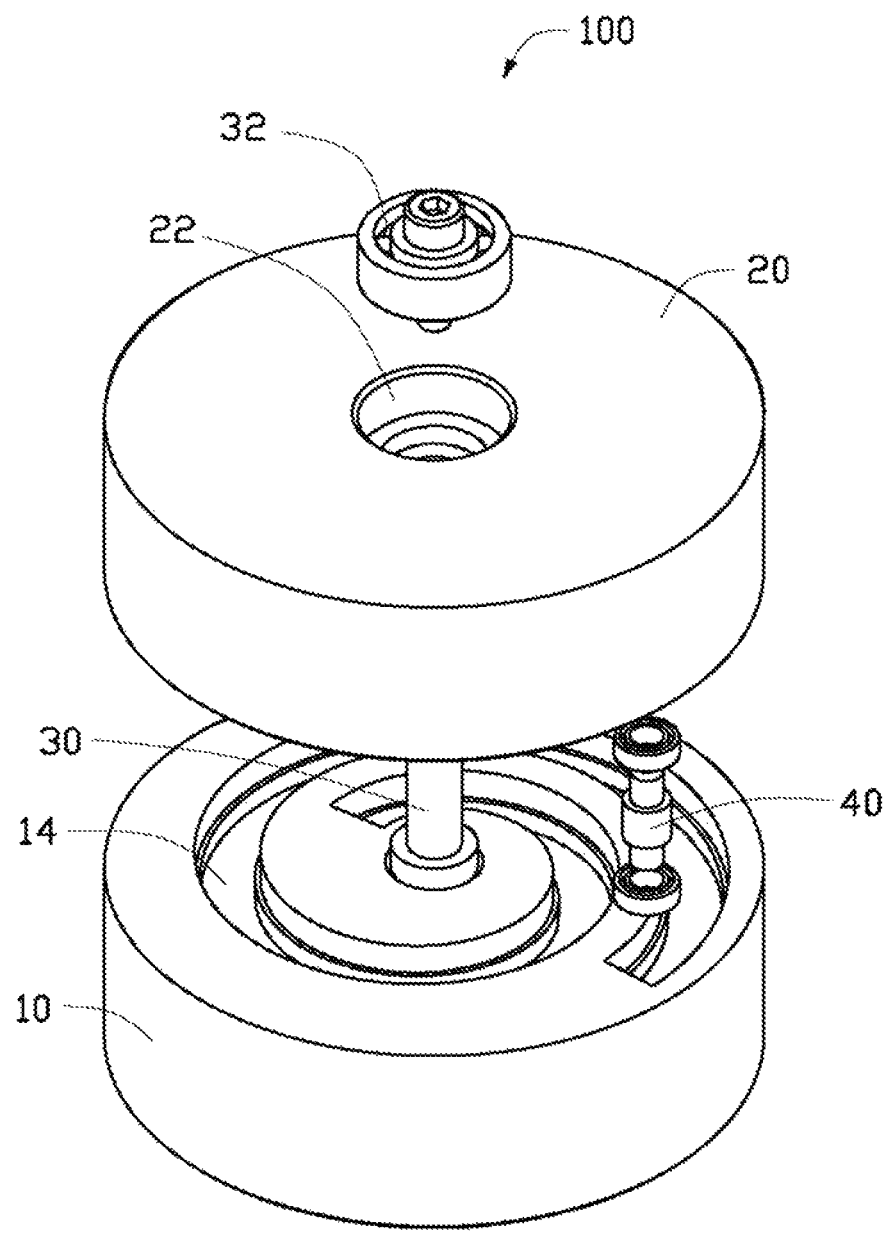
FIG. 1 is a perspective view of a rotation limiting device according to embodiments of the present disclosure.
Figure 2:
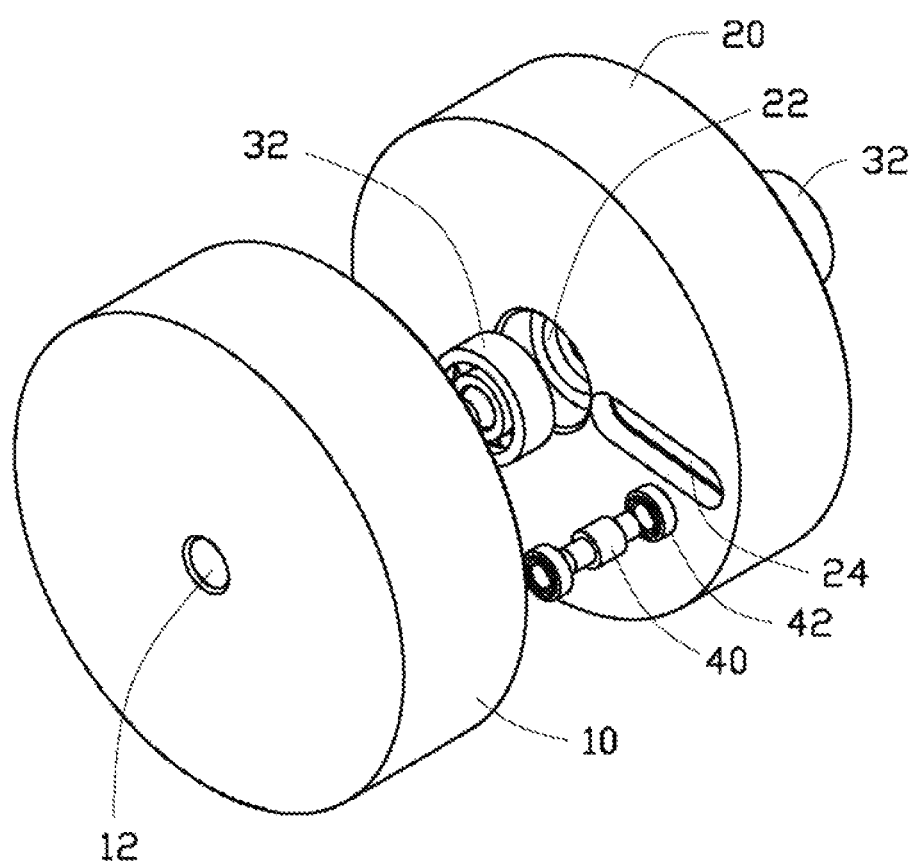
FIG. 2 is a perspective view of the rotation limiting device of FIG. 1 from another angle.

Referring to FIGS. 1-2, the present disclosure provides a rotation limiting device 100. The rotation limiting device 100 includes a base 10, a rotator 20, a connecting shaft 30, and a rotating shaft 40, etc. The connecting shaft 30 may be configured to rotatably connect the base 10 and the rotator 20 and to allow the rotating shaft 40 to slide between the base 10 and the rotator 20 by rotating the rotator 20.

Figure 3:
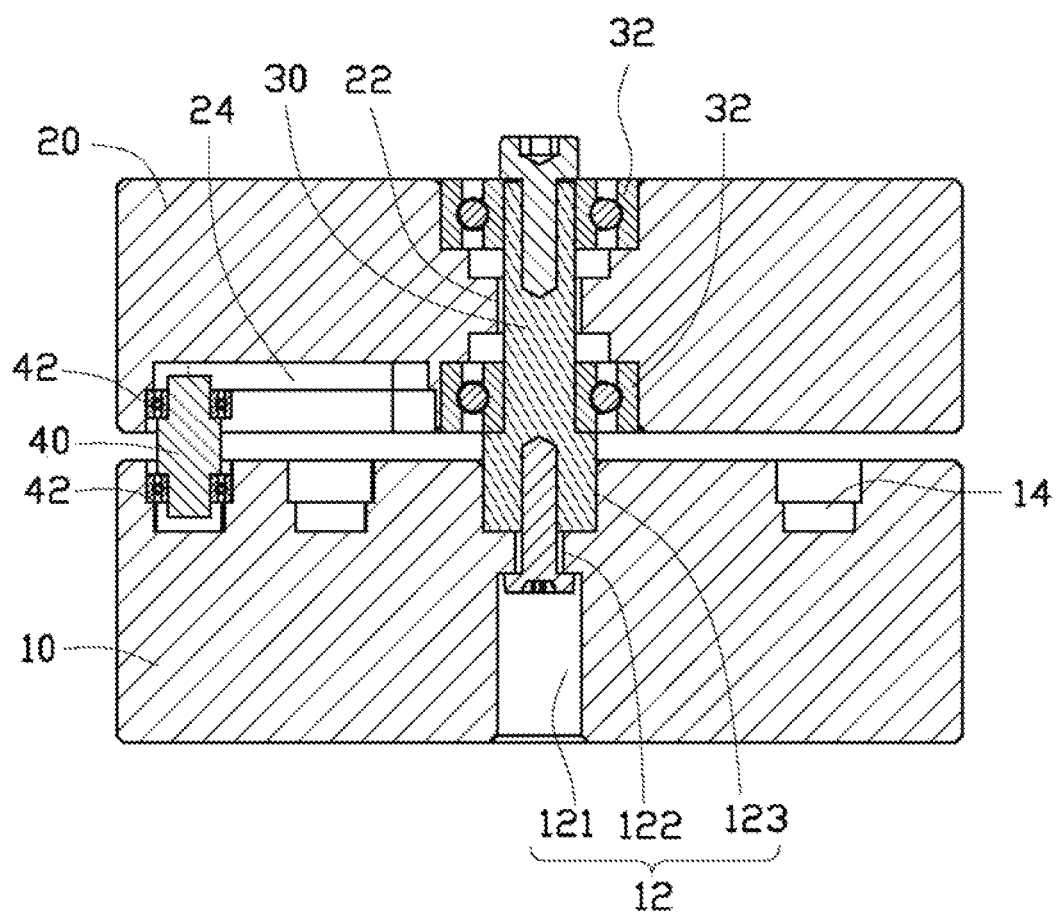
FIG. 3 is a cross sectional view of the rotation limiting device of FIG. 1.
Figure 4:
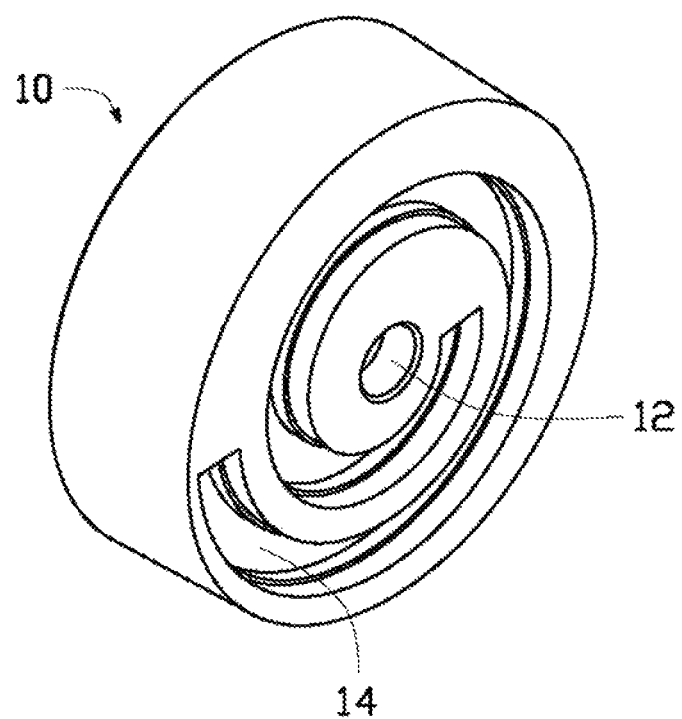
FIG. 4 is a perspective view of a base of the rotation limiting device of FIG. 1.
Figure 5:
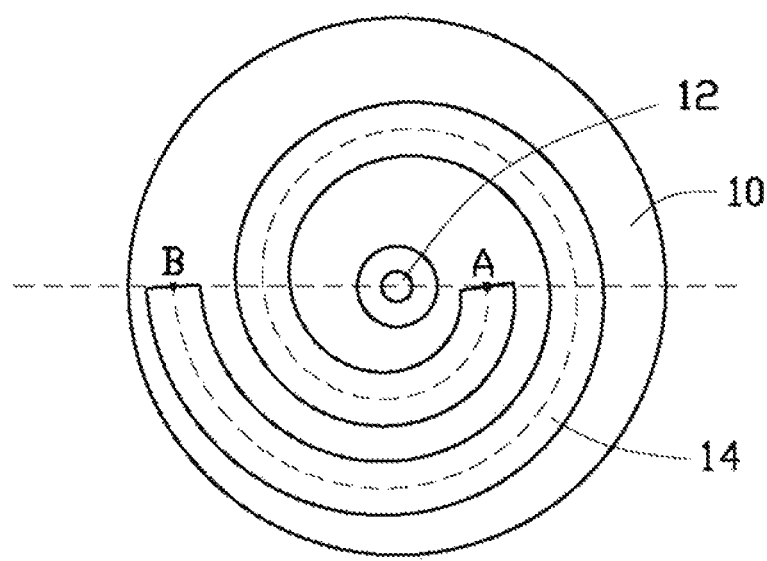
FIG. 5 is a front view of the base of FIG. 4.

Referring to FIGS. 3-5, the base 10 may be in a discoid shape, a first connecting hole 12 may be provided at the center of the base 10, a spiral groove 14 may be provided on the surface of the discoid shape of the base 10. The spiral groove 14 may start at a first position A close to the first connecting hole 12, and terminate at a second position B distant from the first connecting hole 12 after spirally rotating from position A to position B. A line connecting the first position A and the second position B may pass through the first connecting hole 12. That is, the line connecting the first position A and the second position B may extend along a radial direction of the base 10. The space between the first position A and the first connecting hole 12 may be less than the space between the second position B and the first connecting hole 12. The second position B may be close to a periphery of the base 10. In some embodiments, the spiral groove 14 may spirally rotate an angle of approximately 480° with the center of the base 10 as the center of a circle. However, in some other embodiments, a spiral angle of the spiral groove 14 may be an arbitrary angle greater than 360° within a range allowed by the diameter of the base 10. The first connecting hole 12 may be a stepped hole and comprise three segments of holes with different diameters, for example, a first hole 121, a second hole 122 and a third hole 123 in sequence. In some embodiments, the third hole 123 and the spiral groove 14 may be on a same surface. The diameter of the second hole 122 may be less than the diameters of the first hole 121 and the third hole 123 disposed on two ends thereof and, thus, two shoulders may be formed on the two ends of the second bole 122.

Figure 6:
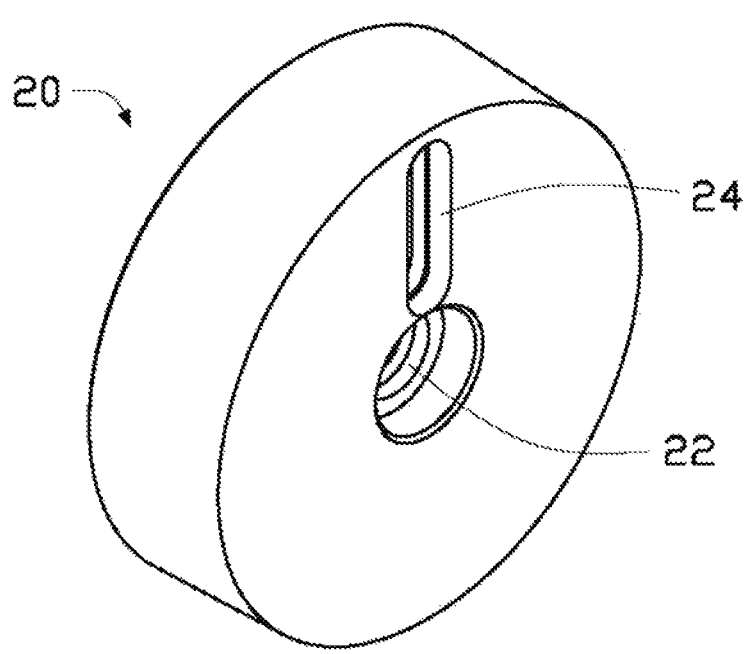
FIG. 6 is a perspective view of a rotator of the rotation limiting device of FIG. 1.
Figure 7:
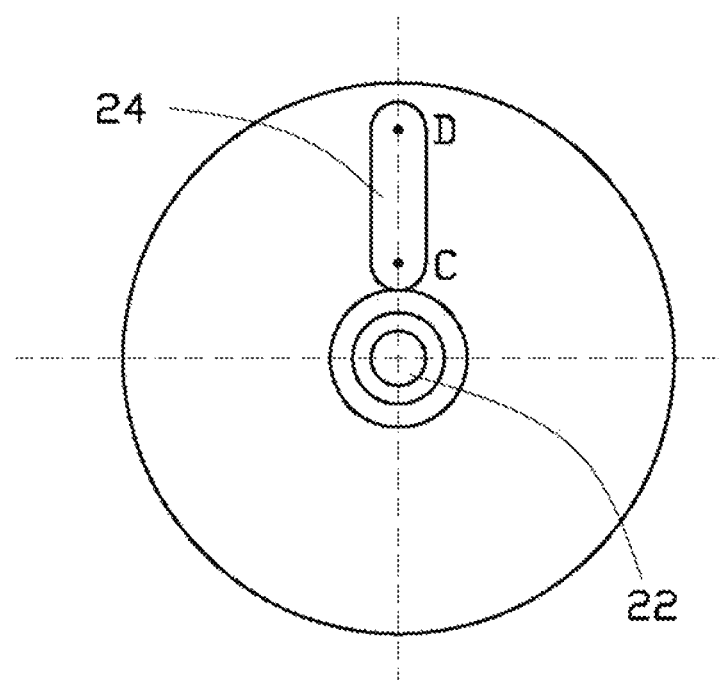
FIG. 7 is a front view of the rotator of FIG. 6.

Referring to FIGS. 6-7, the rotator 20 may be substantially in a discoid shape and have a diameter substantially equivalent to the diameter of the base 10. However, in some embodiments, the size and the shape of the rotator 20 may be different from that of the base 10. A second connecting hole 22 may be provided at the center of the surface of the discoid shape of the rotator 20, and a stripe groove 24 may be provided on one of surfaces of the rotator 20. The stripe groove 24 and the spiral groove 14 of the base 10 may be disposed face to face. The stripe groove 24 may extend along the radial direction of the rotator 20. The stripe groove 24 may start at a first position C close to the second connecting hole 22, and extend linearly along the radial direction of the rotator 20 to a second position D distant from the second connecting hole 22 and stops at the second position D. The first position C may correspond to the first position A of the spiral groove 14 of the base 10 and, in particular, these two positions may be opposite perpendicularly. The second position D may be close to the periphery of the rotator 20 and correspond to the second position B of the spiral groove 14 of the base 10 and, in particular, these two positions may be opposite perpendicularly. That is, the distance between the first position C and the second position D of the stripe groove 24 may be equal to the distance between the first position A and the second position B of the spiral groove 14.

It can be understood that, in some other embodiments, the first position C may not correspond to the first position A of the spiral groove 14 of the base 10, while the second position D may be close to the periphery of the rotator 20 and correspond to the second position B of the spiral groove 14 of the base 10. The first position C may correspond to the first position A of the spiral groove 10 of the base 10, while the second position D may be close to the periphery of the rotator 20 and may not correspond to the second position B of the spiral groove 14 of the base 10. Alternatively, the first position C may not correspond to the first position A of the spiral groove 14 of the base 10, while, at the same time, the second position may be close to the periphery of the rotator 20 and may not correspond to the second position B of the spiral groove 14 of the base 10.

Referring to FIGS. 1-3, the connecting 30 may be rotatably connected between the base 10 and the rotator 20. In some embodiments, the connecting shaft 30 may be rotatably connected in the rotator 20 through two first bearings 32. The two first bearings 32 may be mounted respectively in the second connecting hole 22 of the rotator 20, each one of the two first bearings 32 may be levelled with a surface of the rotator 20 corresponding thereto after being mounted within the second connecting hole 22. One end of the connecting shaft 30 may pass through the two first bearings 32 and the connecting shaft 30 may be over fitting with the two first bearings 32.

One end of the connecting shaft 30 may be fixed to a side of one of the two first bearings 32 through a connecting screw, and the other end of the connecting shaft 30 may protrude out of one of the two first bearings 32 and be fixedly connected to the base 10. In some embodiments, the other end of the connecting shaft 30 may abut against shoulder portions of the first connecting hole 12 of the base 10, and be fixedly connected in the first connecting hole 12 of the base 10 through another connecting screw. However, the rotatable connection between the base 10 and the rotator 20 may not be limited to the implementation dependent on the first bearings 32 on the connecting shaft 30, other means may be employed to rotatably connect the base 10 with the rotator 20.

The rotating shaft 40 may be slidably connected between the base 10 and the rotator 20. One end of the rotating shaft 40 may be slidably connected in the spiral groove 14 of the base 10, and the other end of the rotating shaft 40 may be slidably connected in the stripe groove 24 of the rotator 20. In some embodiments, two ends of the rotating shaft 40 may be slidably connected respectively in the base 10 and the rotator 20 through two second bearings 42. The two second bearings 42 may be sleeved respectively at two ends of the rotating shaft 40 and received respectively in the spiral groove 14 of the base 10 and the stripe groove 24 of the rotator 20. In some embodiments, each one of the two ends of the rotating shaft 40 may pass through the second bearings 42 and protrude out thereof. Correspondingly, shapes of grooves of the spiral groove 14 of the base and the stripe groove 24 of the rotator 20 for receiving two ends of the rotating shaft 40 may be provided as stepped grooves, thereby the second bearing 42 with a greater diameter may be received in a groove with a greater width of the stepped grooves, and an end with a smaller diameter and protruding out of the rotating shaft 40 of the second bearing 42 may be received in a groove with a smaller width of the stepped grooves. A shaft shoulder formed between the stepped grooves can abut exactly against the second bearings 42 to prevent the second bearings 42 to shift in its vertical direction.

A rotating process of the rotation limiting device 100 may be performed by the various components of the rotation limiting device 100 as follows.

(1) Before rotating, the rotating shaft 40 may be located at a rotation starting position of the base 10 and the rotator 20. Specifically, one of the second bearings 42 on two ends of the rotating shaft 40 may be located at the first position A of the spiral groove 14 of the base 10, the other one of the second bearings 42 may be located at the first position C of the rotator 20.

(2) The rotator 20 is rotated, due to the limitation of the spiral groove 14 of the base 10, the one of the second bearings 42 of the rotating shaft 40 which is received in the spiral groove 14 may only move along a spiral line. At the same time, due to the limitation of the stripe groove 24 of the rotator 20, the other one of the second bearings 42 of the rotating shaft 40 which is received in the stripe groove 24 may only move along a straight line.

(3) As the rotator 20 is being rotated, the rotating shaft 40 slides from the first position A to the second position B along the spiral groove 14, the other end of the rotating shaft 40 may slide from the first position C to the second position D along the stripe groove 24, and the rotation of the rotator 20 is stopped at this point. The total rotating angle may be approximately 480° or other preset limitation degrees at this time.

It should be noted that the spiral groove 14 and the stripe groove 24 may be not limited to be provided respectively on the base 10 and the rotator 20, it is also possible that the stripe groove 24 may be provided on the base 10 and the spiral groove 14 may be provided on the rotator 20, which may likewise enable the rotating shaft 40 to slide in the spiral groove 14 and the stripe groove 24, thereby rotation and limitation of wide angles between the rotator 20 and the base 10 may be achieved.

The rotation limiting device 100 according to a disclosed embodiment of the present invention may provide a spiral groove 14 and a stripe groove 24 between a base 10 and a rotator 20 which may be capable of rotating with respect to each other, two ends of the rotating shaft 40 may be slidably received respectively in the spiral groove 14 and the stripe groove 24 by the rotating shaft 40 connected between the base 10 and the rotator 20. When the rotator 20 is being., rotated, the two ends of the rotating shaft 40 may slide respectively along the spiral groove 14 and the stripe groove 24, in turn the rotating angle of the rotator 20 may be greater than 360° and the rotation may be limited by the rotating angle.

It can be understood that various respective modifications and alternatives may occur to those skilled in the art according to technical concepts of the present invention, and all these modifications and alternatives should belong to the scope to be sought for protection by the claims of the invention.

What is claimed is:

1. A rotation limiting device, comprising:
   a base;
   a rotator capable of rotating relative to the base; and
   a rotating shaft slidably connected between the base and the rotator, wherein:
   a spiral groove is provided on one of the base and the rotator, and a stripe groove opposite to the spiral groove is provided on the other one of the base and the rotator,
   an angle of the spiral groove rotating from a starting position to a terminal position is greater than 360°,
   one end of the rotating shaft is slidably received in the spiral groove, and the other end of the rotating shaft is slidably received in the stripe groove,
   two ends of the rotating shaft are respectively sleeved with two bearings,
   the bearing at one end is slidably received in the spiral groove, and
   the bearing at the other end is slidably received in the stripe groove.

2. The rotation limiting device of claim 1, wherein the spiral groove is provided on a surface of the base and spirally rotates approximately 480° with a center of the base as a center of a circle of rotation.

3. The rotation limiting device of claim 1, wherein:
   the spiral groove and the stripe groove is disposed face to face, and
   a terminal position of the spiral groove and a terminal position of the stripe groove are opposite perpendicularly.

4. The rotation limiting device of claim 1, wherein:
   a first connecting hole is provided at a center of the base,
   a second connecting hole is provided at a center of the rotator, and a connecting shaft is fixed in the first connecting hole of the base and is rotatably connected in the second connecting hole of the rotator.

5. The rotation limiting device of claim 4, wherein two bearings are sleeved on the connecting shaft and mounted in the second connecting hole of the rotator.

6. The rotation limiting device of claim 4, wherein
a starting position of the spiral groove is closer to the first connecting hole of the base than a terminal position of the spiral groove, and
a line connecting the starting position and the terminal position of the spiral groove passes through the first connecting hole.

7. The rotation limiting device of claim 4, wherein
a starting position of the stripe groove is closer to the second connecting hole of the rotator than a terminal position of the stripe groove, and
a line connecting the starting position and the terminal position of the stripe groove extends along a radial direction of the rotator.

8. The rotation limiting device of claim 4, wherein:
the first connecting hole is a stepped hole and comprises three hole segments with different diameters, a first hole, a second hole, and a third hole, in sequence;
the first hole and the third hole is disposed on two ends the second hole; and
a diameter of the second hole is less than a diameters of the first hole and a diameters of the third hole, such that two shoulders are formed on the two ends of the second hole.

9. The rotation limiting device of claim 8, wherein the third hole and the spiral groove are on a same surface.

10. A rotation limiting device, comprising:
a base;
a rotator capable of rotating relative to the base; and
a rotating shaft slidably connected between the base and the rotator, wherein:
a spiral groove is provided on one of the base and the rotator, and a stripe groove opposite to the spiral groove is provided on the other one of the base and the rotator,
two ends of the rotating shaft are slidably connected respectively in the spiral groove and the stripe groove and are respectively sleeved with two bearings,
the bearing at one end is slidably received in the spiral groove,
the bearing at the other end is slidably received in the stripe groove, and
the rotator is rotated to cause the rotating shaft to slide from starting positions of the spiral groove and the stripe groove to terminal positions of the spiral groove and the stripe groove, such that a rotation angle of the rotator is greater than 360°.

11. The rotation limiting device of claim 10, wherein the spiral groove is provided on a surface of the base and spirally rotates approximately 480° with a center of the base as a center of a circle of the rotation.

12. The rotation limiting device of claim 10, wherein:
the spiral groove and the stripe groove is disposed face to face, and
a terminal position of the spiral groove and a terminal position of the stripe groove are opposite perpendicularly.

13. The rotation limiting device of claim 10, wherein:
a first connecting hole is provided at a center of the base,
a second connecting hole is provided at a center of the rotator, and
a connecting shaft is fixed in the first connecting hole of the base and is rotatably connected in the second connecting hole of the rotator.

14. The rotation limiting device of claim 13, wherein two bearings are sleeved on the connecting shaft and mounted in the second connecting hole of the rotator.

15. The rotation limiting device of claim 13, wherein:
a starting position of the spiral groove is closer to the first connecting hole of the base than a terminal position of the spiral groove, and
a line connecting the starting position and the terminal position of the spiral groove passes through the first connecting hole.

16. The rotation limiting device of claim 13, wherein:
a starting position of the stripe groove is closer to the second connecting hole of the rotator than a terminal position of the stripe groove, and
a line connecting the starting position and the terminal position of the stripe groove extends along a radial direction of the rotator.

17. The rotation limiting device of claim 13, wherein:
the first connecting hole is a stepped hole and comprises three hole segments with different diameters, a first hole, a second hole, and a third hole, in sequence;
the first hole and the third hole is disposed on two ends the second hole; and
a diameter of the second hole is less than a diameters of the first hole and a diameters of the third hole, such that two shoulders are formed on the two ends of the second hole.

18. The rotation limiting device of claim 17, wherein the third hole and the spiral groove are on a same surface.

* * * * *